June 3, 1930. S. E. TRAVIS, JR 1,762,000
FLOOR AND CORNER STRUCTURE FOR TRUCK BODIES
Original Filed Jan. 26, 1928  2 Sheets-Sheet 2

INVENTOR.
Simeon E. Travis, Jr.
BY
Geo. P. Kimmel
ATTORNEY.

Patented June 3, 1930

1,762,000

UNITED STATES PATENT OFFICE

SIMEON E. TRAVIS, JR., OF HATTIESBURG, MISSISSIPPI

FLOOR AND CORNER STRUCTURE FOR TRUCK BODIES

Original application filed January 26, 1928, Serial No. 249,693. Divided and this application filed March 5, 1929. Serial No. 344,533.

This invention relates to a truck body designed primarily for the handling of crated, cased or boxed bottled goods, is a division of my application Serial No. 249,693, filed January 26, 1928, and the invention has for its object to provide, in a manner as hereinafter set forth, a truck body having one or more decks and so constructed and arranged whereby it can be easily loaded and unloaded and carry its load to the best advantages under all road conditions.

A further object of the invention is to provide. in a manner as hereinafter set forth, a truck body having one or more decks including housing means for the wheels which permits of the truck body being built close to the ground whereby the load on the upper deck can be brought down in convenient reach of the operator standing on ground, under such conditions eliminating the necessity of climbing on the truck, and further lowering the center of gravity of the load resulting in the reduction of wear and tear on the truck chassis and tires, or its possibility of overturning on rough roads.

A further object of the invention provides as set forth in a manner as hereinafter referred to, the providing of a metallic truck body with new and improved floor and corner structures capable of being expeditiously set up to reduce manufacturing cost and further resulting in long life of the truck body, as well as providing for reinforced corners to insure rigidity to the truck body.

Further objects of the invention are to provide, in a manner as hereinafter set forth, a truck body designed to be attached to any form of chassis, which is simple in its construction and arrangement, strong, durable, compact, thoroughly efficient in its use, readily installed with respect to the chassis, of minimum weight, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 7 is a fragmentary view in plan of the flooring of the lower deck of the truck body.

Figure 8 is a fragmentary view in plan of a modified form of the flooring of the lower deck of the truck body.

Figure 1:
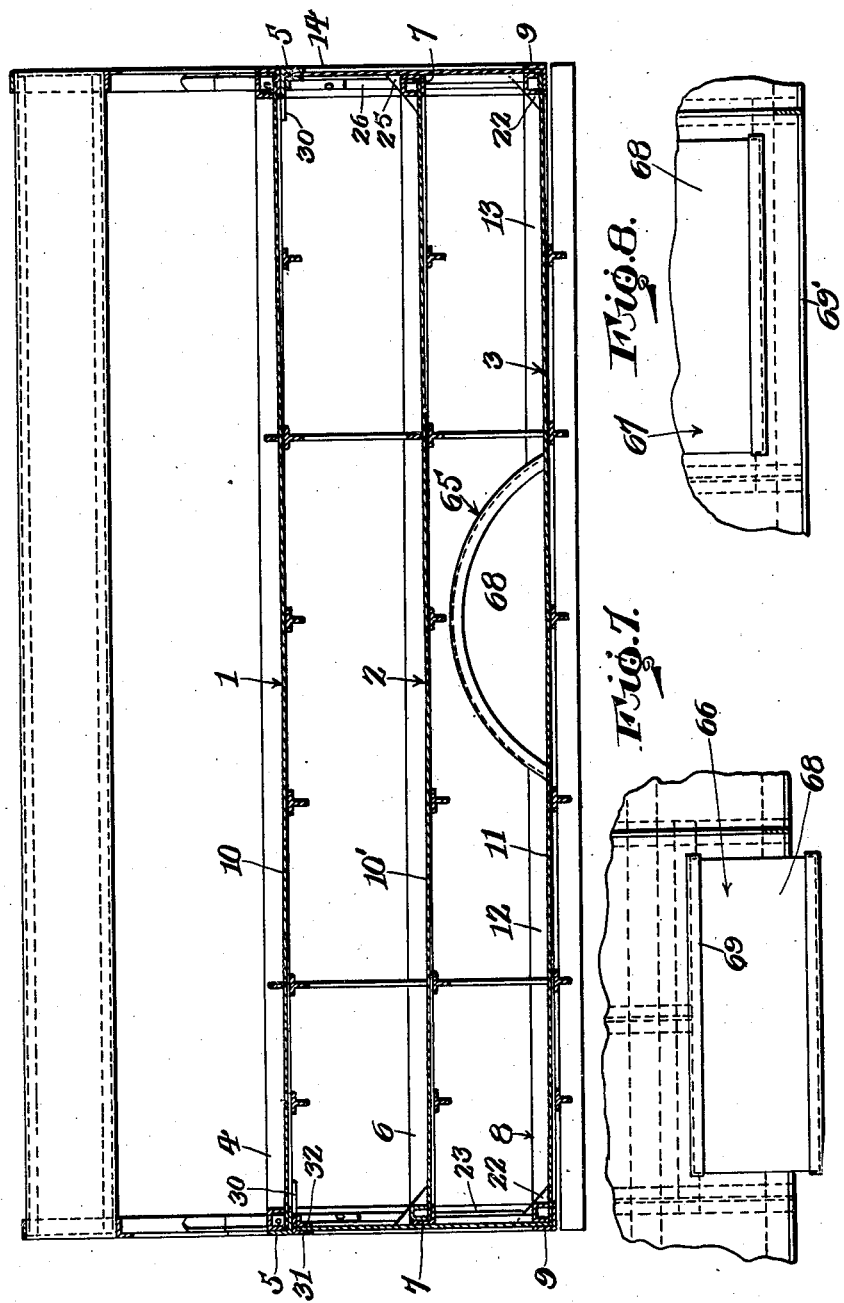
Figure 1 is a longitudinal sectional view of a metallic truck body in accordance with this invention.
Figure 2:
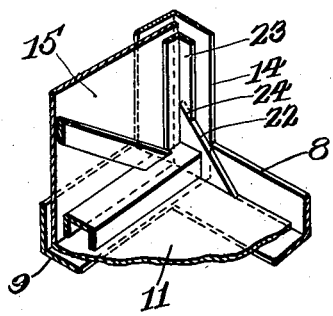
Figure 2 is a fragmentary view in perspective of one of the lower corners of the truck body.
Figure 3:
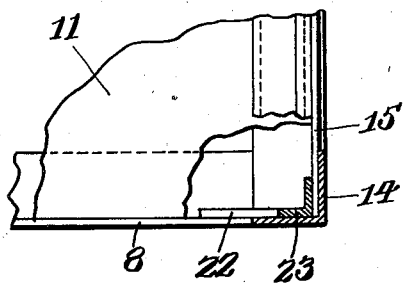
Figure 3 is a fragmentary view in sectional plan of a corner of the truck body.

In describing the structure as illustrated by the drawings reference will not be made to elements or structural elements not part of the invention forming the subject matter of this application. Those elements or structural features not referred to, will be found and specifically described in my application Serial No. 249,963, filed January 26, 1928, of which this application is a division.

Referring to the drawings the truck body is illustrated as including an upper deck 1, an intermediate deck 2 and a lower deck 3. Each deck includes a pair of side rails and a pair of end rails. Each of the rails is of angle-shaped cross section and formed with a vertical and a horizontal leg or portion. The end rails are oppositely disposed and the side rails positioned in the same manner. The side rails of the upper deck are indicated at 4 and the end rails at 5. The side rails of the intermediate deck are indicated at 6 and the end rails at 7 and the side rails of the lower deck are indicated at 8 and the end rails at 9. The horizontal portions of said rails extend inwardly. Secured upon the horizontal portions of the rails 4, 5 is the flooring 10 for the upper deck 1. Secured upon the horizontal portions of the rails 6 and 7 is a flooring 10' for the intermediate deck 2 and secured upon the horizontal portions of the rails 8, 9 is a flooring 11 for the lower deck 3.

With reference to Figures 1 and 7 the side rails 8 of the lower deck 3 are formed of two sections 12, 13 for a purpose to be hereinafter referred to.

The truck body includes four vertically disposed rails 14, one for each corner of said body and each corner rail is common to the decks of the truck body. The rails 4, 5 of the upper deck are welded to the top of the corner rails 14.

The forward and rear corners of the lower deck are of like construction. The forward and rear corners of the intermediate deck are of like construction and the forward and rear corners of the top or upper deck are of like construction. But one corner construction will be described in connection with the lower deck, as the description thereof will apply to the other corner constructions of such deck, and this statement will apply to the corner constructions of the intermediate deck, as well as the upper or top deck.

Figure 5:
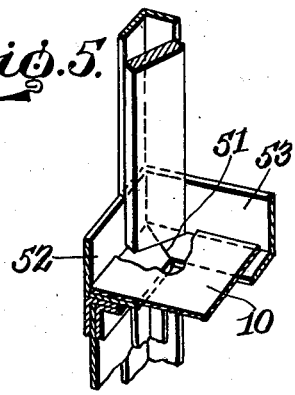
Figure 5 is a fragmentary view in perspective of one of the corners of the upper deck illustrating a modified form.

Referring to Figure 5 which illustrates the construction for each of the corners of the lower deck a corner rail 14 has one of the legs thereof mitred to the vertical leg of an end rail 9. The horizontal leg of the end rail 9 abuts against the inner face of and is welded to the other leg of the corner rail 14. An end of the side rail 8 or the outer end of a section of the side rail 8 abuts against and is welded to the end rail 12 and corner rail 14. The flooring 11 is positioned upon the horizontal leg portions of the rails 8 and 9 and abuts against the vertical legs of such rails, as well as the inner faces of the legs of the rails 14. A gusset plate 22 is arranged against and secured to the rails 8 and 14. The gusset plate 22 is vertically disposed and arranged within rails 8 and 14. An end plate 15 is positioned against the inner face of the vertical leg of the rail 9, against the inner face of that leg of the rail 14 which is mitred to the leg 9 and further abuts against the inner face of the other leg of rail 14. An angle shaped retaining member 23 is positioned against the plate 15 and also against the inner face of one of the legs 14 and secured therewith.

The retaining member 23 is cut away as at 24 to provide a clearance for the gusset plate 22. The retaining member is vertically disposed.

Figure 6:
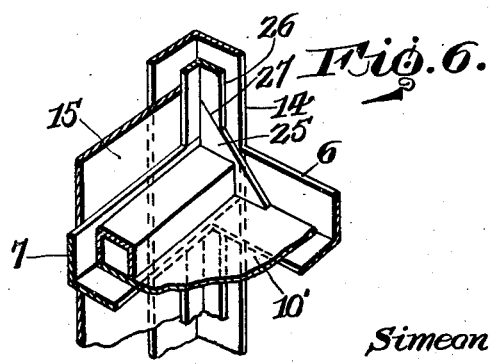
Figure 6 is a fragmentary view in perspective of one of the corners of the intermediate deck of the truck body.

Figure 6 illustrates the manner of setting up each of the corners of the intermediate deck and the constructive arrangement shown by Figure 6 will apply to each corner of the intermediate deck. Figure 6 shows one of the forward corners of the intermediate deck and with the corner rail 14 having one of its legs overlapping the plate 15, as well as being welded thereto. The end rail 7 is arranged against the inner face of plate 15 and abuts against the inner face of leg 14. The side rail 6 abuts against and is welded to one of the legs of the rail 14 and against the horizontal leg of the rail 7. Positioned against the inner faces of rails 6 and 14 is an upstanding gusset plate 25. Abutting against the plate 15 and also the inner face of rail 14, as well as being secured therewith is a vertically extending retaining member 26 of angle-shaped cross section and which is cut away as at 27 to provide a clearance for the gusset plate 25. The member 26 has one of its legs secured upon the top edge of rail 7.

Figure 4:
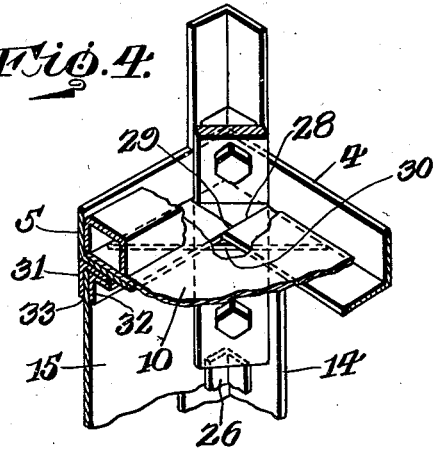
Figure 4 is a fragmentary view in perspective of one of the corners of the upper deck of the truck body.

Figure 4 illustrates one manner of setting up each of the corners of the upper deck and the description thereof will apply to each of said corners. The horizontal leg of the rail 4 and the horizontal leg of the rail 5 is cut away to provide an opening 28. Said horizontal legs, however, are of a length whereby a portion of the end edge of the horizontal leg of the rail 4 will abut against the free side edge of the horizontal leg of the rail 5. The abutting edges are welded together as at 29. The vertical legs of rails 4 and 7 abut the ends thereof and are welded together. The corner rail 14 has its upper end secured to the bottom of the vertical legs of the rails 4 and 5.

Welded against the lower faces of the horizontal legs of the rails 4 and 5 is a gusset plate 30. Abutting against the gusset plate is an inverted, angle-shaped rail 31 which is secured to the horizontal portion of the rail 5. Also abutting against the gusset plate 30 is one end of an angle-shaped retaining member 32 which is secured to the horizontal portion of the rail 31 and further opposes the vertical portion of the rail 31 in spaced relation to provide a pocket 33 into which extends the plate 15.

By reference to Figure 5 it illustrates another manner of setting up each of the corners of the upper deck and the description thereof will apply to each of said corners. The difference resides in the mitering and welding together the side and end rails, as indicated at 51. In Figure 5 an end rail is indicated at 52 and side rail at 53. In Figure 5 the gusset plate 30 which anchors the side rail to an end rail is dispensed with.

In Figure 6 the flooring 10' of the intermediate deck is secured upon the horizontal portions of the side and end rails 6, 7. In Figure 4 the flooring 10 is secured upon the horizontal portions of the side and end rails 4, 5 and in Figure 5 the flooring 10 is secured upon the horizontal portions of the end and side rails 52, 53. The gusset 30 shown in Figure 4 is secured against the lower faces of the horizontal portions of the side and end rails 4, 5.

With reference to Figures 1 and 7, the flooring 11 of the lower deck 3 is provided with a pair of wheeled fenders 65, 66 which are arranged to project laterally from each side of the lower deck of the truck when the wheels are arranged slightly beyond the sides of the truck body.

With reference to Figure 8 the flooring 11 of the lower deck 3 is set up in a manner whereby the fenders are arranged inwardly with respect to the side edges of such deck. Only one of such fenders is shown and is indicated at 67. The fender 67 is arranged to project laterally beyound the wheels.

Each fender comprises a vertically disposed arcuate body 68 reinforced at each side as at 69. The flooring 11 is cut away to provide the necessary clearance for the wheels and the body portion of the fender registers with the edges of the cutout portion.

With reference to Figure 1, there is illustrated the side rail 8 formed of two sections 12 and 13 and which is arranged in such manner in view of the fact that the fender intersects such side rail. The sections of the side rail abut and are welded to the fender. In Figure 8 as the fender has its outer side arranged inwardly with respect to the side rail, it is unnecessary to form the latter of two sections, and in Figure 8 such side rail is indicated at 69'.

The fenders are what may be termed housing means for the wheels and which permits of the truck body being built close to the ground whereby the load on the upper deck can be brought down in convenient reach of the operator standing on ground, under such conditions eliminating the necessity of climbing on the truck. Further this arrangement lowers the center of gravity of the load resulting in the reduction of wear and tear on the truck chassis and tires, or a possibility of overturning on rough roads.

What I claim is:

1. A truck body of that type having one or more spaced superposed decks, each deck including side and end rails of angle-shaped cross section to provide vertical and horizontal legs and with the latter extending inwardly from the lower end of the former, each deck further including a flooring secured upon said horizontal legs, upstanding corner rails of angle-shaped cross section, abutting said flooring, the end rails of said lowermost deck having the vertical and the horizontal legs thereof abutting against the corner rails, the ends of the side rails of the lowermost deck abutting against the free edges of the horizontal legs of the end rails of such deck and further abutting against one edge of said corner rails, said end rails being secured to one edge of each of said side and corner rails.

2. A truck body of that type having one or more spaced superposed decks, each deck including side and end rails of angle-shaped cross section to provide vertical and horizontal legs and with the latter extending inwardly from the lower end of the former, each deck further including a flooring secured upon said horizontal legs, upstanding corner rails of angle-shaped cross section abutting said flooring, the end rails of said lowermost deck having the vertical and the horizontal legs thereof abutting against the corner rails, the ends of the side rails of the lowermost deck being squared and abutting against the free edges of the horizontal legs of the end rails of such deck and further abutting against one edge of said corner rails, said end rails being secured to one edge of each of said side and corner rails, and upstanding gussets supported by said flooring and secured to the inner faces of said corner and side rails.

3. A truck body comprising side and end rails of angle-shaped cross section to provide vertical and horizontal portions, a flooring secured upon said horizontal portions, upstanding corner rails of angle-shaped cross section abutting said flooring, said end rails having the vertical portions thereof mitered and welded to one leg of said corner rails, said end rails having the horizontal portions abutting the inner face of the other leg of said corner rails, said side rails having the ends thereof squared and abutting the free edges of the horizontal portions of the end rails and further abutting against one edge of said corner rails, said end rails being secured to said side and corner rails.

4. A truck body comprising side and end rails of angle-shaped cross section to provide vertical and horizontal portions, a flooring secured upon said horizontal portions, upstanding corner rails of angle-shaped cross section abutting said flooring, said end rails having the vertical portions thereof mitered and welded to one leg of said corner rails, said end rails having the horizontal portions abutting the inner face of the other leg of said corner rails, said side rails having the ends thereof squared and abutting the free edges of the horizontal portions of the end rails and further abutting against one edge of said corner rails, said end rails being secured to said side and corner rails, and upstanding gussets being secured to the inner faces of said flooring, corner and side rails.

5. A truck body comprising side and end rails of angle shaped cross section to provide vertical and horizontal legs and with the horizontal legs extending inwardly of the bottoms of the vertical legs, a flooring secured upon said horizontal legs and abutting against the inner faces of the vertical legs, upstanding corner rails of angle-shaped cross section and each formed of a pair of legs, one of the legs of each corner rail seated upon said flooring, the legs of the said end rails abutting said corner rails, and the ends of the side rails, below said flooring abutting against the free edges of the horizontal legs of the end rails and against the free edge of one of the legs of each of the corner rails.

6. A truck body comprising side and end rails of angle shaped cross section to provide vertical and horizontal legs and with the horizontal legs extending inwardly from the bottom of the vertical legs, a flooring secured upon said horizontal legs and abutting the inner faces of the vertical legs, the ends of the horizontal legs of said end rails being mitered, upstanding corner rails of angle-shaped cross section and formed of a pair of legs, the lower end of one of the legs of each of said corner rails being mitered, the other legs of said corner rails having their inner faces abutting said flooring, the mitered lower ends of the rails of said corner rails welded to the mitered ends of the horizontal legs of said end rails and the ends of the side rails, below said flooring abutting against the free edges of the horizontal legs of the end rails and against the free edge of the non-mitered leg of each of the corner rails.

7. A truck body comprising side and end rails of angle-shaped cross section to provide vertical and horizontal legs and with the horizontal legs extending inwardly of the bottoms of the vertical legs, a flooring secured upon said horizontal legs and abutting against the inner faces of the vertical legs, upstanding corner rails of angle-shaped cross section and each formed of a pair of legs, one of the legs of each corner rail seated upon said flooring, the legs of the said end rails abutting said corner rails, and the ends of the side rails, below said flooring abutting against the free edges of the horizontal legs of the end rails and against the free edge of one of the legs of each of the corner rails, and upstanding gussets supported by said flooring and secured to the inner faces of the legs of the corner rails and the vertical legs of the side rails.

8. A truck body comprising side and end rails of angle shaped cross section to provide vertical and horizontal legs and with the horizontal legs extending inwardly from the bottom of the vertical legs, a flooring secured upon said horizontal legs and abutting the inner faces of the vertical legs, the ends of the horizontal legs of said end rails being mitered, upstanding corner rails of angle-shaped cross section and formed of a pair of legs, the lower end of one of the legs of each of said corner rails being mitered, the other legs of said corner rails having their inner faces abutting said flooring, the mitered lower ends of the legs of said corner rails welded to the mitered ends of the horizontal legs of said end rails and the ends of the side rails, below said flooring abutting against the free edges of the horizontal legs of the end rails and against the free edge of the non-mitered leg of each of the corner rails, and upstanding gussets supported by said flooring and secured to the inner faces of the legs of the corner rails and the vertical legs of the side rails.

In testimony whereof, I affix my signature hereto.

SIMEON E. TRAVIS, Jr.